E. E. MACK.
ADJUSTABLE FERRULE FOR RAKE HANDLES AND THE LIKE.
APPLICATION FILED NOV. 18, 1915.
1,182,288. Patented May 9, 1916.
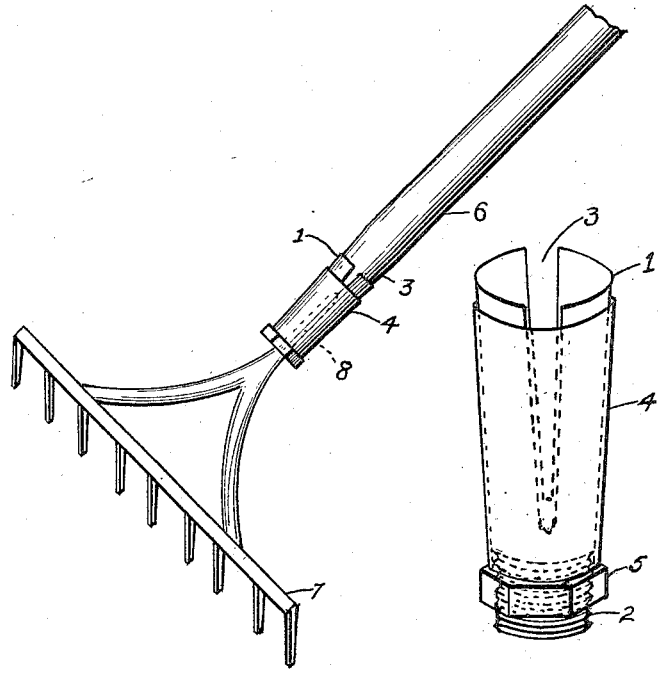
FIGURE 1. FIGURE 2.
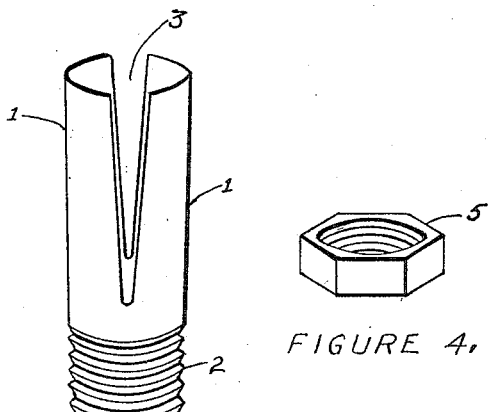 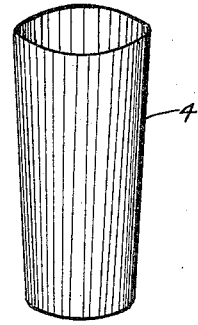
FIGURE 3. FIGURE 4. FIGURE 5.
WITNESSES:
E. O. Berger.
C. E. Lodge
INVENTOR:
Elmer E. Mack
By F. C. Bates
HIS ATTORNEY.

UNITED STATES PATENT OFFICE.

ELMER E. MACK, OF LOS GATOS, CALIFORNIA, ASSIGNOR OF ONE-THIRD TO HERBERT HOOPER, OF LOS GATOS, CALIFORNIA.

ADJUSTABLE FERRULE FOR RAKE-HANDLES AND THE LIKE.

1,182,288.  Specification of Letters Patent.  Patented May 9, 1916.

Application filed November 18, 1915. Serial No. 62,159.

*To all whom it may concern:*

Be it known that I, ELMER E. MACK, a citizen of the United States, residing at Los Gatos, in the county of Santa Clara and State of California, have invented certain new and useful Improvements in Adjustable Ferrules for Rake-Handles and the like, of which the following is a specification.

My invention relates to an adjustable ferrule for rake handles and the like and the objects of my invention are, first, to provide a ferrule that can be adjusted to a handle by simply turning a nut on the end of said ferrule; second, to provide a ferrule that when adjusted, will closely adhere to the handle to which the same is attached; third, to provide a handle ferrule that when the shank of a rake or the like gets loose in the handle into which it is driven, the turning of a nut will not only adjust the ferrule thereon, but will also tighten the handle around said shank and make the same firm in place.

A still further object of the invention is generally to improve this class of ferrules so as to increase their utility, durability and efficiency.

Further objects and advantages will appear in the following description, it being understood that various changes in form, proportions and minor details of construction may be resorted to within the scope of the appended claims.

For a full understanding of the invention and the merits thereof, reference is to be had to the following description and accompanying drawings, in which—

Figure 1 is a perspective view of my adjustable ferrule attached to a rake handle in which is shown a rake; Fig. 2 is a perspective view of my adjustable ferrule assembled; Fig. 3 is a detail view of inner part of my adjustable ferrule, showing open slots, and threaded on the lower end thereof. Fig. 4 is a detail view of the adjusting nut. Fig. 5 is a detail view of the tapering adjusting tube.

Corresponding and like parts are referred to in the following description and indicated in all the views of the drawing by the same reference numbers.

My improved adjustable ferrule forming the subject matter of the present invention comprises a ferrule 1, which may be made of any suitable metal of the required thickness, and of any size and length required, having threads cut at the lower end thereof, as shown at 2, and slots cut in said ferrule, as shown at 3; these slots are adapted to close inward when the tapering tube 4 is placed on over the outside thereof, and the same being forced upward by adjusting nut 5 when the same is screwed on to threads 2; said tapering tube 4 is made of metal tubing of the required length and size, and of the required taper to fit on over ferrule 1, the same being adapted to close ferrule 1 tightly around the end of handle 6 into which shank 8 of rake 7 has been driven; should said ferrule 1 or shank 8 of rake 7 get loose, the turning of nut 5 upward will tighten both of them in place.

Having thus described my invention, what I claim as new, and desire to secure by Letters Patent, is:

1. In an adjustable metal ferrule of the character described, having threads cut at the lower end thereof, adapted to screw a nut thereon, said ferrule having slots cut therein adapted to close inward, a tapering tube adapted to be placed on over said ferrule, an adjusting nut adapted to be screwed on said ferrule, and to force said tube upward for the purpose of adjusting said ferrule tightly around the end of a rake handle or the like to which said ferrule is attached, as shown and described.

2. In an adjustable ferrule of the character described, the combination of a metal ferrule having threads cut on the lower end thereof, and slots cut in the upper portion thereof, a metal tapering tube adapted to fit over said ferrule, a nut adapted to carry said tube upward and close said ferrule tightly around the handle to which said ferrule may be attached, means by which a shank of a rake, or the like may be driven into a handle to which said ferrule is attached and tightened in place by said nut, tube, and ferrule, as shown and described.

In testimony whereof I affix my signature in the presence of two subscribing witnesses.

ELMER E. MACK.

Witnesses:
H. L. PARTREDGE,
F. M. HORTON.

Copies of this patent may be obtained for five cents each, by addressing the "Commissioner of Patents, Washington, D. C."